F. KUHN AND J. A. HAND.
ELECTRIC PERCOLATOR.
APPLICATION FILED FEB. 21, 1918.
1,359,390.
Patented Nov. 16, 1920.
2 SHEETS—SHEET 1.
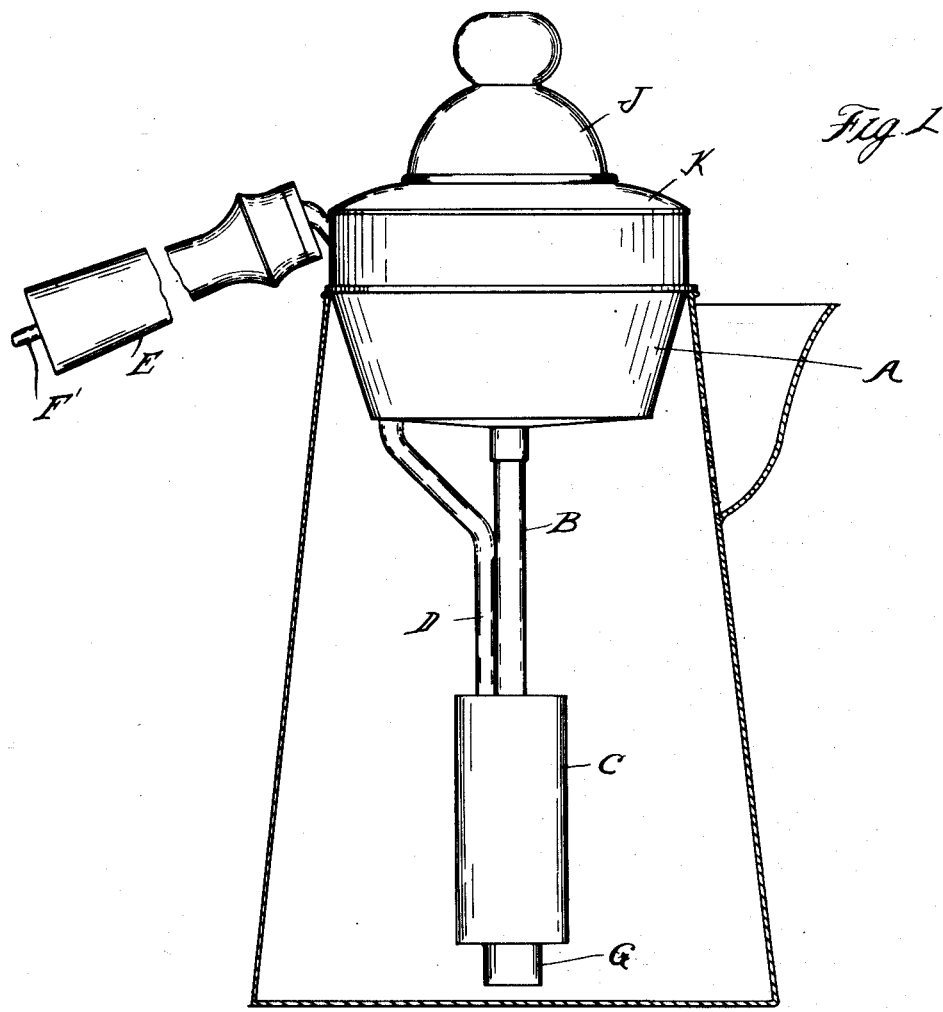
Inventors
Frank Kuhn
Jay A. Hand F. KUHN AND J. A. HAND.
ELECTRIC PERCOLATOR.
APPLICATION FILED FEB. 21, 1918.
1,359,390.
Patented Nov. 16, 1920.
2 SHEETS—SHEET 2.
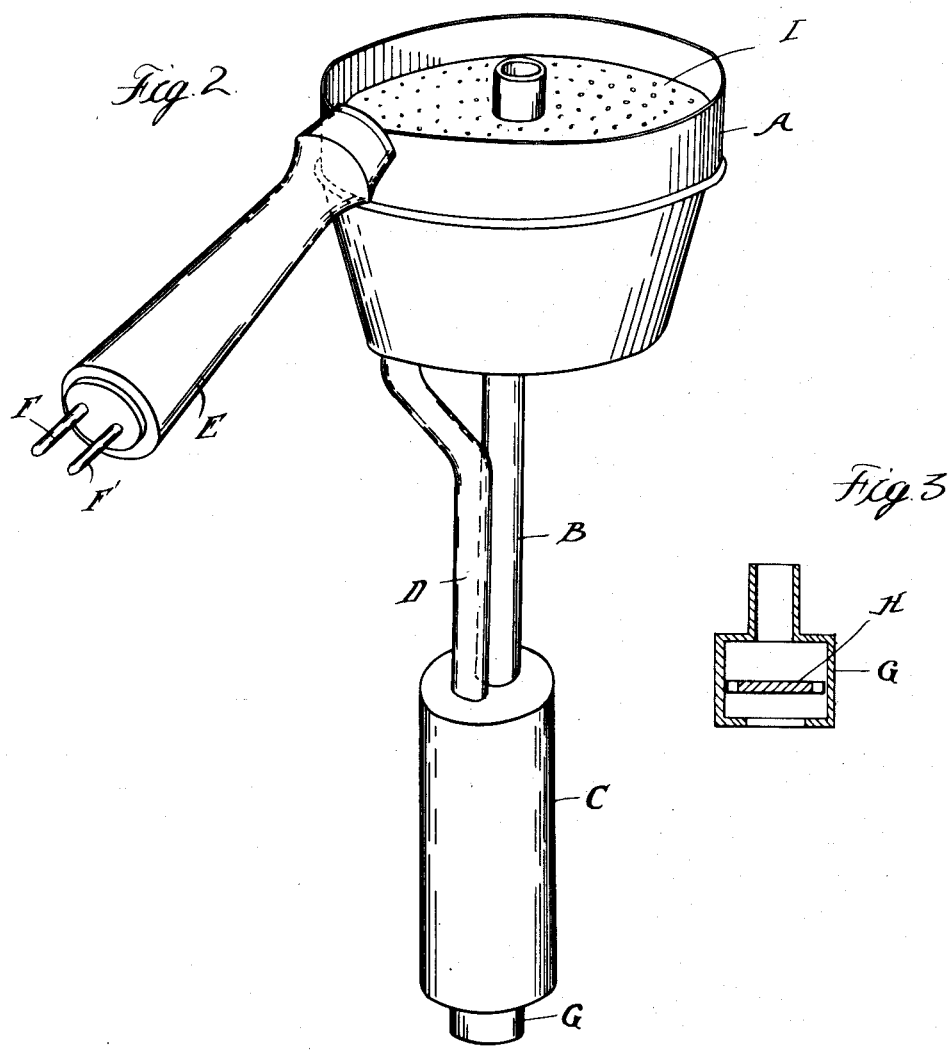
Inventors
Frank Kuhn
Jay A. Hand
By Whittemore Hulbert + Whittemore
Attorneys

UNITED STATES PATENT OFFICE.

FRANK KUHN AND JAY A. HAND, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRIC PERCOLATOR.

1,359,390.  Specification of Letters Patent.  Patented Nov. 16, 1920.

Application filed February 21, 1918. Serial No. 218,396.

*To all whom it may concern:*

Be it known that we, FRANK KUHN and JAY A. HAND, both citizens of the United States of America, residing at Detroit, in the county of Wayne and State of Michigan, have invented certain new and useful Improvements in Electric Percolators, of which the following is a specification, reference being had therein to the accompanying drawings.

The invention relates to percolators which are operated by electrical heat, and it is the object of the invention to provide a construction which may be used in connection with an ordinary coffee pot or other vessel not provided with the electrical equipment. To this end the invention comprises the construction of an attachable percolator unit as hereinafter set forth.

In the drawings:

Figure 1 is a sectional elevation of the unit as arranged in connection with a coffee pot;

Fig. 2 is a perspective view of the unit detached;

Fig. 3 is a section through the valve.

In the construction of percolators, it is usual to provide the bottom of the coffee pot or other vessel with a hot well, from which the liquid is periodically ejected by vapor pressure and refilled by the cooler liquid. It is therefore necessary to provide a special construction of pot which can be used only for the one purpose. It is frequently desirable to make a larger quantity of coffee than can be obtained by the vessel provided with the equipment, which necessitates either the abandonment of the percolator or its use in successive operations. With the present construction the percolator unit is independent of the vessel for containing the liquid, and therefore may be used in connection with vessels of varying size, as occasion demands.

Our improved construction comprises essentially a hot-well which is independent of the liquid-holding vessel and may be immersed therein, a container for the coffee or other material and valve-controlled connections through which the liquid is periodically admitted to the well and is ejected over the material in the container. There is also an electrical heating unit for the hot-well, which is protected from the liquid and is provided with suitable connections.

As specifically shown, A is the perforated container for the coffee or other material, which is of a size to fit within an ordinary coffee pot, and B is the tube extending centrally through the container A, its lower portion forming the hot-well and being surrounded with a casing C containing the electrical heating unit. As the specific construction of this heating unit is not essential to the present invention, we have omitted showing the same. D is a conduit extending upward from the casing C and inclosing the electrical conductors, said conduit being attached to the side of the container A and extending laterally therefrom. E is a handle mounted on the laterally-extending portion of the conduit D and provided at its outer ends with terminal contacts F and F'. At the lower end of the tube B there is arranged an inlet controlling valve, this being preferably located in a separate casing G telescopically engaging the tube B and containing the valve H. I is the perforated cover for the receptacle A, and J is the usual glass top for the font engaging the cover K.

In use, the unit may be carried by the handle E and placed in an ordinary coffee pot or other vessel of any size. Electrical connection is then made with the contacts F and F', which will cause the percolating action, and when this is complete the unit may be removed from the pot. In case the capacity of the container A is too small for the quantity of water in the pot, after the strength of the material is exhausted the unit may be removed, the container re-filled, the unit replaced and the action continued.

What we claim as our invention is:

1. A percolator unit, comprising a font-tube, an inwardly-opening check-valve at the lower end thereof, an electrical heater adjacent to a portion of said tube above said valve, a liquid-proof casing for said heater and its connections, and a perforated receptacle secured to the upper end of said tube and supporting the same in the liquid container.

2. A percolator unit comprising a container detachably mounted upon the open end of a liquid-holding container, and a font and hot-well suspended from said first-mentioned container and in coöperative relation.

3. A percolator unit comprising a container for the material, a font and an electrically heated hot well mounted in operative relation to each other and adapted to be detachably suspended within a liquid-holding vessel.

In testimony whereof we affix our signatures.

FRANK KUHN.
JAY A. HAND.